United States Patent
Mahood

(10) Patent No.: US 7,709,592 B2
(45) Date of Patent: May 4, 2010

(54) PROCESS FOR PREPARING POLYESTERCARBONATES

(75) Inventor: James Alan Mahood, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 12/101,953

(22) Filed: Apr. 11, 2008

(65) Prior Publication Data

US 2009/0259014 A1    Oct. 15, 2009

(51) Int. Cl.
*C08G 63/00* (2006.01)
*C08G 63/02* (2006.01)

(52) U.S. Cl. .................. 528/176; 524/51; 524/94; 524/165; 524/306; 524/500; 524/539; 524/604; 525/434; 525/439; 525/462; 528/173; 528/177; 528/178; 528/182; 528/196; 528/198; 528/271; 528/272; 528/361; 528/372

(58) Field of Classification Search .................. 525/51, 525/94, 165, 306, 500, 539, 604, 434, 439, 525/462; 528/173, 177, 178, 182, 196, 198, 528/271, 272, 361, 372, 176; 524/51, 94, 524/165, 306, 500, 539, 604
See application file for complete search history.

(56) References Cited

U.S. PATENT DOCUMENTS

| | | | |
|---|---|---|---|
| 4,130,548 A * | 12/1978 | Kochanowski | 528/176 |
| 4,169,868 A | 10/1979 | Schreckenberg et al. | |
| 4,286,083 A * | 8/1981 | Kochanowski | 528/173 |
| 4,297,455 A | 10/1981 | Lindner et al. | |
| 5,015,720 A | 5/1991 | Boden et al. | |
| 5,274,068 A * | 12/1993 | Boden et al. | 528/179 |
| 5,278,279 A | 1/1994 | Kanno et al. | |
| 5,387,628 A | 2/1995 | Kanno et al. | |
| 5,408,027 A | 4/1995 | Haese et al. | |
| 5,418,269 A | 5/1995 | Ishiwa et al. | |
| 5,455,302 A | 10/1995 | Saito et al. | |
| 5,484,874 A | 1/1996 | Ishiwa et al. | |
| 5,494,997 A | 2/1996 | Fontana et al. | |
| 5,608,026 A | 3/1997 | Hoover et al. | |
| 6,232,429 B1 | 5/2001 | Banach et al. | |
| 6,346,597 B1 | 2/2002 | Banach et al. | |
| 6,395,364 B1 | 5/2002 | Davis et al. | |
| 6,486,294 B1 | 11/2002 | Brack et al. | |
| 7,087,682 B2 | 8/2006 | Tadros et al. | |
| 2003/0104234 A1 * | 6/2003 | Bruder et al. | 428/480 |
| 2003/0139564 A1 * | 7/2003 | Kratschmer et al. | 528/196 |

FOREIGN PATENT DOCUMENTS

| | | |
|---|---|---|
| EP | 0522752 A2 | 1/1993 |
| EP | 0522752 B1 | 4/1998 |
| EP | 1230288 B1 | 9/2005 |
| EP | 1478676 B1 | 4/2007 |
| EP | 1312084 B1 | 6/2007 |
| JP | 08143655 | 6/1995 |
| WO | 0132742 A1 | 5/2001 |
| WO | 0148050 A1 | 7/2001 |
| WO | 0211134 A1 | 2/2002 |
| WO | 03070804 A1 | 8/2003 |

* cited by examiner

*Primary Examiner*—Terressa M Boykin

(57) ABSTRACT

Processes for preparing polyestercarbonates are disclosed. The processes allow for the consistent incorporation of adipic acid into a polymer generated from a dihydroxy compound, such as bisphenol-A, at levels greater than 99%. The polyestercarbonates so produced, as well as articles formed from the polyestercarbonates, are also disclosed herein.

24 Claims, No Drawings

PROCESS FOR PREPARING POLYESTERCARBONATES

BACKGROUND

The present disclosure relates to processes for preparing polyestercarbonate (PEC) compositions. In this regard, the disclosure relates to the interfacial synthesis of polyestercarbonates and to compositions produced by such processes.

Polycarbonates (PC) are synthetic thermoplastic resins derived from bisphenols and phosgene, or their derivatives. They are linear polyesters of carbonic acid and can be formed interfacially from reaction of dihydroxy compounds with phosgene or via ester interchange by reaction of dihydroxy compounds with a carbonate diester.

The desired properties of polycarbonates include clarity or transparency (i.e. 90% light transmission or more), high impact strength and toughness, heat resistance, weather and ozone resistance, good ductility, being combustible but self-extinguishing, good electrical resistance, noncorrosive, nontoxic, etc. They are useful for forming a wide array of products, such as by molding, extrusion, and thermoforming processes.

In producing a polycarbonate, a homopolycarbonate is generally formed from the polymerization of a dihydroxy compound such as bisphenol-A. However, when a dicarboxylic acid is copolymerized with bisphenol-A, a polyestercarbonate results. A variety of dicarboxylic acids have been copolymerized with bisphenol-A to form various polyestercarbonates. Such polyestercarbonates generally have lower glass transition temperatures, better melt flow rates, and better ductility relative to a bisphenol-A homopolymer.

Adipic acid (also known as hexanedioic acid; 1,4-butanedicarboxylic acid; $HOOC-(CH_2)_4-COOH$) is perhaps one of the most desirable dicarboxylic acids to copolymerize with bisphenol-A. This is due, in part, to its low cost. However, short chain dicarboxylic acids like adipic acid are difficult to incorporate into polyestercarbonates. Poor incorporation of adipic acid can create undesirable quality issues, while incomplete incorporation leaves residual adipic acid in process streams that can adversely affect downstream operations.

Short chain dicarboxylic acids have been successfully incorporated via interfacial polymerization when used in an activated form, such as the acid chloride or anhydride form. See, for example, U.S. Pat. No. 5,015,720. However, these activated forms are more expensive than the simple dicarboxylic acid. In addition, they may contain color contaminants that cause the final polymer to be highly colored. This is undesirable for applications in which a transparent or low color polymer composition is sought.

U.S. Pat. No. 5,274,068 describes methods for producing polyestercarbonates via interfacial polymerization using simple dicarboxylic acids like adipic acid. The examples achieve a range of 17% to 99% incorporation of adipic acid. This large variation suggests that some critical process variables have not been identified. Such variation is also usually unacceptable for commercial manufacturing processes. In particular, the wide range of incorporation occurs with only small changes in the amount of time for which reactions were allowed to occur.

Accordingly, it is desirable to generate new processes that allow for consistent incorporation of high levels of adipic acid into a polyestercarbonate.

BRIEF DESCRIPTION

Disclosed, in various embodiments, are methods for producing polyestercarbonates that can incorporate substantially all of a relatively short chain dicarboxylic acid, such as adipic acid. Also disclosed are the resulting polyestercarbonates produced by these methods or articles formed therefrom.

In one embodiment, a process for producing a polyestercarbonate is disclosed, wherein the process comprises:

preparing an initial mixture comprising water, a substantially water immiscible organic solvent, a dihydroxy compound, a catalyst, and adipic acid, wherein the volume ratio of organic solvent to water is 10:1 or more;

reacting the initial mixture by adding phosgene at a first phosgenation rate until the molar ratio of phosgene added to the sum of the dihydroxy compound and the adipic acid is at least 70 percent, while maintaining the pH between about 4 and about 6 to form a reaction mixture;

raising the pH to about 9.5; and maintaining the pH at about 9.5 for a period of time of from about 5 minutes to about 60 minutes.

In further embodiments, the organic solvent may be methylene chloride. The catalyst may be triethylamine.

The volume ratio of organic solvent to water of the initial mixture may be about 20:1 or more.

In some embodiments, the molar ratio of catalyst to the sum of the dihydroxy compound and the adipic acid in the initial mixture may be at least 4 percent, about 5 percent or more, or about 8 percent or more.

The process, in certain embodiments, may further comprise adding phosgene to the reaction mixture at a second phosgenation rate while the pH is maintained at about 9.5.

In other embodiments, the dihydroxy compound may have the structure of Formula (I):

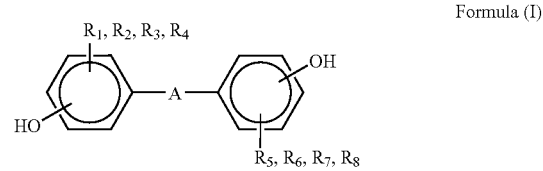

Formula (I)

wherein $R_1$ through $R_8$ are each independently selected from hydrogen, halogen, nitro, cyano, $C_1$-$C_{20}$ aliphatic, $C_1$-$C_{20}$ alkyl, $C_4$-$C_{20}$ cycloalkyl, and $C_6$-$C_{20}$ aryl; and A is selected from a bond, $-O-$, $-S-$, $-SO_2-$, $C_1$-$C_{12}$ aliphatic, $C_1$-$C_{12}$ alkyl, $C_6$-$C_{20}$ aromatic, and $C_6$-$C_{20}$ cycloaliphatic.

The first phosgenation rate may be such that the molar ratio of phosgene added to the sum of the dihydroxy compound and the adipic acid does not reach 70 percent until after 20 minutes, or after 35 minutes.

In some embodiments, the initial mixture further comprises an endcapping agent. In other embodiments, an endcapping agent is added to the initial mixture along with the carbonate precursor.

The processes form polyestercarbonates which can be used to form articles.

In other embodiments, a process for preparing a polyestercarbonate is disclosed, wherein the process comprises:

preparing an initial mixture comprising water, a substantially water-immiscible organic solvent, a dihydroxy compound, a catalyst, and adipic acid, wherein the molar ratio of catalyst to the sum of the dihydroxy compound and the adipic acid is at least 4 percent;

reacting the initial mixture by adding phosgene at a first phosgenation rate until the molar ratio of phosgene added to the sum of the dihydroxy compound and the adipic acid is at least 70 percent, while maintaining the pH between about 4.5 and about 6.0 to form a reaction mixture; and completing the reaction by adding phosgene while maintaining the pH at about 9.5 for a period of time of from about 20 minutes to about 40 minutes.

In yet other embodiments, a process for preparing a polyestercarbonate is disclosed, wherein the process comprises:

preparing an initial mixture comprising water, a substantially water-immiscible organic solvent, a dihydroxy compound, a catalyst, and adipic acid, wherein (i) the volume ratio of organic solvent to water is 10:1 or more and (ii) the molar ratio of catalyst to the sum of the dihydroxy compound and the adipic acid is at least 4 percent;

reacting the initial mixture by adding phosgene at a first phosgenation rate until the molar ratio of phosgene added to the sum of the dihydroxy compound and the adipic acid is at least 70 percent, while maintaining the pH between about 4 and about 6 to form a reaction mixture;

raising the pH to about 9.5; and adding phosgene while maintaining the pH at about 9.5 until the reaction is substantially complete.

The polyestercarbonates formed using such processes, as well as articles formed from such polyestercarbonates, are also disclosed. These and other non-limiting characteristics are more particularly described below.

DETAILED DESCRIPTION

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement techniques of the type described in the present application to determine the value.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups comprise at least one carbon atom and may include heteroatoms such as nitrogen, sulfur, silicon, selenium and oxygen. Aliphatic groups may be substituted or unsubstituted. Exemplary aliphatic groups include, but are not limited to, methyl, ethyl, isopropyl, isobutyl, chloromethyl, hydroxymethyl (—$CH_2OH$), mercaptomethyl (—$CH_2SH$), methoxy, methoxycarbonyl ($CH_3OCO$—), nitromethyl (—$CH_2NO_2$), and thiocarbonyl.

The term "alkyl" refers to a linear or branched array of atoms that is composed exclusively of carbon and hydrogen. Alkyl groups may be saturated or unsaturated; in other words, they may be alkanes, alkenes, or alkynes. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-$CCl_3$Ph-).

The term "cycloaliphatic" refers to an array of atoms which is cyclic but which is not aromatic. The cycloaliphatic group may include heteroatoms such as nitrogen, sulfur, selenium, silicon and oxygen. A cycloaliphatic group may comprise one or more noncyclic components. For example, a cyclohexylmethyl group ($C_6H_{11}CH_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The polyestercarbonates of the present disclosure are prepared from an initial mixture comprising water, a substantially water immiscible organic solvent, a dihydroxy compound, a catalyst, and adipic acid.

Dihydroxy compounds generally have the formula HO—$R^1$—OH, which includes dihydroxy compounds of formula (1)

$$HO-A^1-Y^1-A^2-OH \tag{1}$$

wherein $Y^1$, $A^1$ and $A^2$ are as described above. Also included are bisphenol compounds of general formula (2):

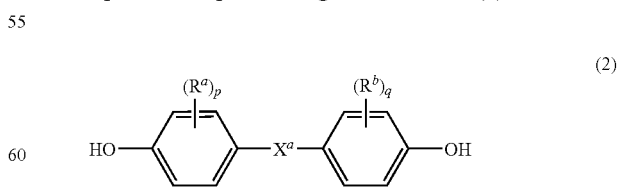

wherein $R^a$ and $R^b$ each represent a halogen atom or a monovalent hydrocarbon group and may be the same or different; p and q are each independently integers of 0 to 4; and $X^a$ represents one of the groups of formula (3):

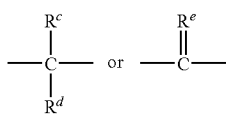

(3)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)-, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (4):

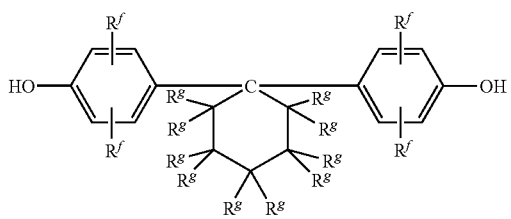

(4)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures.

In some embodiments, the polyestercarbonate may contain structural units of formula (5):

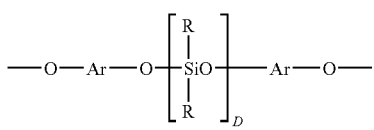

(5)

wherein D has an average value of 2 to 1,000; each R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group; and each Ar may independently be the same or different, and is a substituted or unsubstituted $C_6$-$C_{30}$ arylene radical, wherein the bonds are directly connected to an aromatic moiety. Useful Ar groups in formula (5) may be similar to those shown in formulas (1) or (2) above.

Units of formula (5) may be derived from the corresponding dihydroxy compound of formula (6):

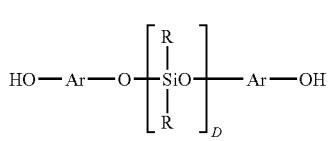

(6)

wherein R, Ar, and D are as described above. Compounds of formula (6) may be obtained by the reaction of a dihydroxyarylene compound with, for example, an alpha, omega-bisacetoxypolydiorganosiloxane under phase transfer conditions.

In other embodiments, the siloxane unit may be derived from structural units of formula (7):

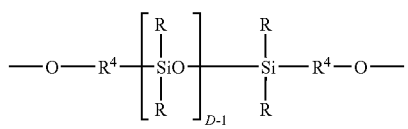

(7)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound.

In other embodiments, the siloxane unit may be derived from structural units of formula (8):

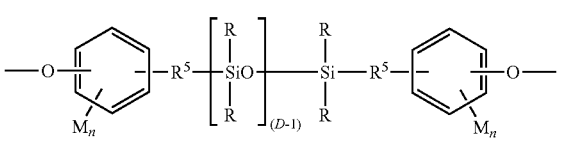

(8)

wherein R and D are as defined above. Each $R^5$ in formula (8) is independently a divalent $C_2$-$C_8$ aliphatic group. Each M in formula (8) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (8) may be derived from the corresponding dihydroxy polydiorganosiloxane (9):

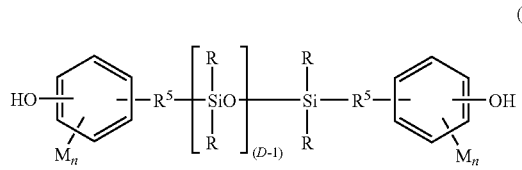

wherein R, D, M, $R^5$, and n are as described above. Such dihydroxy polysiloxanes can be made by effecting a platinum catalyzed addition between a siloxane hydride of formula (10):

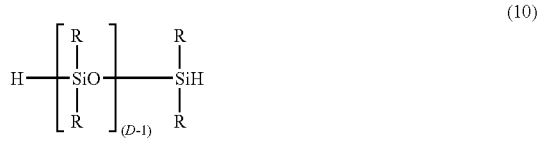

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In specific embodiments, the dihydroxy compound may have the structure of Formula (I):

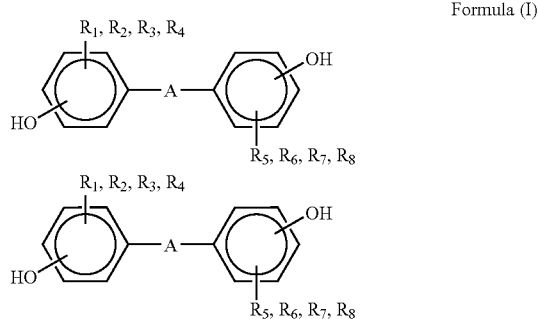

wherein $R_1$ through $R_8$ are each independently selected from hydrogen, halogen, nitro, cyano, $C_1$-$C_{20}$ alkyl $C_1$-$C_{20}$ aliphatic, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, $C_1$-$C_{20}$ aliphatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include:
2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'-dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether; and
1,3-bis(2-(4-hydroxyphenyl)-2-propyl)benzene.

In some embodiments, more than one dihydroxy compound is used. For example, a siloxane-containing dihydroxy compound of formula (6) or (9) could be used with bisphenol-A. In other embodiments, only one dihydroxy compound is used.

In embodiments, the molar ratio of adipic acid to the dihydroxy compound is less than around 15 percent. In specific embodiments, the molar ratio is about 1:9. Higher levels of adipic acid become more difficult to fully incorporate into a polymer backbone without the formation of anhydride linkages, which adversely affect polymer stability.

The water and substantially water immiscible organic solvent allow interfacial polymerization to occur at their interfaces. Suitable organic solvents are known in the art. Exemplary organic solvents include methylene chloride, chloroform, and chlorobenzene. In specific embodiments, the organic solvent used is methylene chloride.

Suitable catalysts for the interfacial polymerization reaction are generally known to those in the art. They include aliphatic amines such as triethylamine. Generally, trialkylamines are especially preferred, wherein the alkyl groups contain up to about 4 carbon atoms. Another suitable catalyst is a phase transfer catalyst. Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, a $C_{1-8}$ alkoxy group or a $C_{6-18}$ aryloxy group. An effective amount of a phase transfer catalyst may be about 0.1% by weight to about 10% by weight based on the weight of dihydroxy compound in the initial mixture. In another embodiment an effective amount of phase transfer catalyst may be about 0.5% by weight to about 2% by weight based on the weight of dihydroxy compound in the initial mixture.

Without being bound by theory, it is believed that the level of incorporation of dicarboxylic acid is determined by several factors. Those factors include (1) the ratio of organic solvent to water and (2) the initial pH of the initial mixture. Other factors include (3) the rate at which phosgene is added to the initial mixture; (4) the total amount of phosgene added to the initial mixture; and (5) the amount of catalyst used.

In embodiments, the volume ratio of organic solvent to water is 10:1 or more. In more specific embodiments, the volume ratio is about 20:1 or more. Without being bound by theory, it is believed that reducing the amount of water in the initial mixture increases the rate at which the adipic acid is transferred into the organic phase where it can react with the phosgene.

In embodiments, the molar ratio of catalyst to the sum of the dihydroxy compound and the adipic acid in the initial mixture (i.e., dihydroxy compound+adipic acid) is at least 4 percent. In further embodiments, the molar ratio is about 5 percent or mores or about 8 percent or more. Without being bound by theory, it is also believed that increasing the amount of catalyst also increases the rate at which the adipic acid is transferred into the organic phase.

The initial mixture is then reacted by adding phosgene to the initial mixture at a first phosgenation rate until the molar ratio of phosgene added to the sum of the dihydroxy compound and the adipic acid is at least 70 percent. While the phosgene is added, the pH is maintained between about 4 and about 6. Without being bound by theory, it is believed that keeping the pH in this range reduces the formation of dianions from the dihydroxy compound, which may slow the reactivity of the dihydroxy compound with phosgene, but still allows significant concentrations of adipic acid anions. It appears that increasing the amount of phosgene added at a pH of between about 4 and about 6 increases the amount of reaction between the adipic acid and the phosgene.

In embodiments, the phosgene is added to the initial mixture at a rate such that the molar ratio of phosgene added to the sum of the dihydroxy compound and the adipic acid is at least 70 percent after 35 minutes, and in more specific embodiments after 20 minutes. Without being bound by theory, it is believed that this low addition rate increase minimizes the probability that the concentration of adipic acid in the organic phase will be prematurely depleted. In embodiments, the phosgene is added for a first period of time ranging from about 15 minutes to about 40 minutes. Put another way, the pH is not raised for a period of time of from about 20 minutes to about 40 minutes.

After the phosgene is added, the pH is raised to about 9.5 and maintained at that level for a period of time, or until the reaction is substantially complete or complete. A certain amount of anhydride linkages are generated by the phosgenation of adipic acid. These anhydride linkages are stable at low pH but react with the dihydroxy compound at the higher pH. If the pH is raised too soon, poor incorporation of adipic acid results. If the pH is raised too late, anhydride linkages will remain in the resulting polyestercarbonate and it will not be thermally stable. If the pH is raised while some dihydroxy compound remains to react with the anhydride compounds, then additional phosgene needs to be added to consume any remaining dihydroxy compound and complete the reaction. The period of time at which the pH is maintained at about 9.5 may be from about 5 minutes to about 60 minutes. In further specific embodiments, the period of time is from about 20 to about 40 minutes. The polyestercarbonate can then be separated from the reaction mixture using methods known in the art.

It has also been found that if optional endcapping agent is added during the polymerization process, the ductility and/or brittleness of the final polyestercarbonate can be affected by when the endcapping agent is added. In embodiments, the endcapping agent may be added to the initial mixture. In other embodiments, the endcapping agent is added to the initial mixture along with the phosgene, i.e. over a longer period of time than when added to the initial mixture.

By optimizing these factors, adipic acid can be reproducibly incorporated into a bisphenol-A polyestercarbonate at levels greater than 99%.

Various additives ordinarily incorporated in resin compositions of this type may also be added to the polyestercarbonate as desired. Such additives include, for example, heat stabilizers; antioxidants; light stabilizers; plasticizers; antistatic agents; mold release agents; and blowing agents. Examples of heat stabilizers include triphenyl phosphite, tris-(2,6-dimethylphenyl)phosphite, tris-(2,4-di-t-butyl-phenyl)phosphite, tris-(mixed mono-and di-nonylphenyl)phosphite, dimethyl-benzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of antistatic agents include glycerol monostearate, sodium stearyl sulfonate, and sodium dodecylbenzenesulfonate. Examples of mold releasing agents include pentaerythritol tetrastearate, stearyl stearate, beeswax, montan wax and paraffin wax.

Colorants may be added if desired. These include pigments, dyes, and quantum dots. The amount may vary as needed to achieve the desired color.

UV absorbers may be used. Exemplary UV absorbers include hydroxybenzophenones; hydroxybenzotriazoles; hydroxybenzotriazines; cyanoacrylates; oxanilides; benzoxazinones; or the like, or combinations comprising at least one of the foregoing UV absorbers.

Anti-drip agents may be included. Anti-drip agents may be, for example, a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A useful TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

A salt-based flame retardant may be added. The flame retardant may be a K, Na, or Li salt. Useful salt-based flame retardants include alkali metal or alkaline earth metal salts of inorganic protonic acids and organic Brönstëd acids comprising at least one carbon atom. These salts should not contain chlorine and/or bromine. Preferably, the salt-based flame retardants are sulfonates. In specific embodiments, the salt-based flame retardant is selected from the group consisting of potassium diphenylsulfon-3-sulfonate (KSS), potassium perfluorobutane sulfonate (Rimar salt), and combinations comprising at least one of the foregoing.

Combinations of any of the foregoing additives may be used. Such additives may be mixed in at a suitable time during the mixing of the components for forming the polyestercarbonate.

The polyestercarbonates of the present disclosure may be formed into articles by conventional plastic processing techniques. Molded articles may be made by compression molding, injection molding or such molding techniques known to those skilled in the art. Such articles may include but are not limited to, film, sheet, pipes, tubes, profiles, molded articles, preforms, stretch molded films and containers, injection molded containers, extrusion molded films and containers, thermoformed articles and the like. Articles prepared from the compositions of the present disclosure may be used in a wide variety of applications.

The following examples are provided to illustrate the polyestercarbonates and methods of the present disclosure. The examples are merely illustrative and are not intended to limit the disclosure to the materials, conditions, or process parameters set forth therein.

EXAMPLES

Example 1

A 75-L reactor was equipped with mechanical agitation and recirculation loop with turnover time <30 seconds, condenser, and caustic scrubber vent system. In Example E1, the reactor was charged with bisphenol-A (4200 g, 18.42 moles), adipic acid (300 g, 2.05 moles), p-cumylphenol (PCP) (145 g, 0.68 moles), triethylamine (30 ml, or 0.22 moles), sodium gluconate (10 g, 0.45 moles), deionized water (1 L), and dichloromethane (24 L). Phosgene (1264 g, 12.74 moles) was then added at a rate of 80 g/min to the reactor while 50 wt % NaOH in water was added at a rate sufficient to maintain a pH of 6.0. Deionized water was cofed with the phosgene at 50 g/minute throughout the phosgene charge to prevent NaCl precipitation. After the initial phosgenation was complete, deionized water (9 L) was added and the pH was raised to 9.5 thru addition of 50 wt % NaOH in water. Additional phosgene (1476 g, 14.9 moles) was then added at 80 g/minute while 50 wt % NaOH in water was added at a rate sufficient to maintain a pH of 9.5. The reactor was then purged with nitrogen for 10 minutes to remove any residual phosgene. A total of 4919 g of 50 wt % NaOH solution was used. Polymer Mw was determined by GPC to be 24,531 relative to PC standards. HPLC analysis of residual adipic acid in the brine phase using an evaporative light scattering detector gave 648 ppm adipic acid, corresponding to adipic acid incorporation of 96.0%.

Four additional example formulations E2-E5 were prepared using the procedure described above. They varied in the amount of catalyst used and in the amount of phosgene added at the lower pH. A lower amount of adipic acid in the brine indicated greater incorporation of the adipic acid into the polyestercarbonate. An HPLC test was used to measure the residual amount of adipic acid left because the integration of NMR peaks typically had an accuracy of only ±2%.

Triethylamine acted as the catalyst. P-cumylphenol (PCP) was an endcapping agent. Sodium gluconate was added to help remove trace metal impurities. The formulations and results are shown in Table 1 below.

TABLE 1

|  | Unit | E1 | E2 | E3 | E4 | E5 |
|---|---|---|---|---|---|---|
| Initial Formulation: |  |  |  |  |  |  |
| Water | L | 1 | 1 | 1 | 1 | 1 |
| $CH_2Cl_2$ | L | 24 | 24 | 24 | 24 | 24 |
| Bisphenol-A | g | 4200 | 4200 | 4200 | 4200 | 4200 |
| triethylamine | mL | 30 | 25 | 125 | 25 | 125 |
| Adipic Acid | g | 300 | 300 | 300 | 300 | 300 |
| PCP | g | 145 | 145 | 145 | 145 | 145 |
| Na Gluconate | g | 10 | 10 | 10 | 10 | 10 |
| $1^{st}$ Phosgenation |  |  |  |  |  |  |
| Initial pH |  | 6 | 6 | 6 | 6 | 6 |
| total phosgene added | g | 1264 | 1000 | 1000 | 1500 | 1500 |
| Phosgenation rate | g/min | 80 | 80 | 80 | 80 | 80 |
| Cofeed water | g/min | 50 | 50 | 50 | 50 | 50 |
| $2^{nd}$ Formulation |  |  |  |  |  |  |
| Water | L | 9 | 9 | 9 | 9 | 9 |
| $2^{nd}$ Phosgenation |  |  |  |  |  |  |
| pH |  | 9.5 | 9.5 | 9.5 | 9.5 | 9.5 |
| total phosgene added | g | 1476 | 1750 | 1750 | 1250 | 1250 |
| Phosgenation rate | g/min | 80 | 80 | 80 | 80 | 80 |
| Total 50 wt % NaOH solution added | g | 4919 | 5189 | 4547 | 5219 | 5077 |
| Polymer Mw | Da | 24531 | 24406 | 25024 | 24318 | 24524 |
| Adipic Acid in Brine | ppm | 648 | 816 | 83 | 127 | 65 |
| Brine Phase | g | 18801 | 18774 | 18132 | 19116 | 18974 |
| Adipic Acid Incorporation | % | 96.0 | 94.9 | 99.5 | 99.2 | 99.6 |

The results showed that very high levels of adipic acid incorporation could be consistently achieved when very little water was used in the initial formulation. Comparing the batches with high catalyst levels (E3/E5) to the batches with low catalyst levels (E2/E4) showed that increasing the amount of catalyst decreased the amount of residual (i.e. unincorporated) adipic acid in the brine. Comparing E2/E3 to E4/E5, as the amount of initial phosgenation increased, the amount of residual adipic acid also decreased.

Example 2

A 200-gallon reactor equipped with mechanical agitation and recirculation loop with turnover time <2 minutes, condenser, and caustic scrubber vent system was provided. In Example E6, the reactor was charged with bisphenol-A (150 lbs), adipic acid (14 lbs), triethylamine (0.66 kg), sodium gluconate (0.36 lbs), deionized water (35 gallons), and dichloromethane (100 gallons). Phosgene (85 lbs) was then added at a rate of 200 lbs/hr to the reactor while 50 wt % NaOH in water was added at a rate to maintain a pH of 6.0. A 33 wt % solution of p-cumylphenol in dichloromethane (7.0 kg) was cofed to the reactor over a five minute period to limit polymer molecular weight growth, with the PCP addition starting after 5 lbs of phosgene had been added. After 60 lbs of phosgene was added the rate of addition of 50 wt % NaOH in water was increased to maintain a reactor pH of 10.3 and an additional 15 gallons of deionized water was added. The phosgene addition rate was reduced to 150 lbs/hr after 76 lbs of phosgene had been added. Additional phosgene (10 lbs) was then added at 150 lbs/hr while 50 wt % NaOH in water was added at a rate to reduce the pH to 8.8. A total of 188.6 lbs of 50 wt % NaOH solution was used in this batch. HPLC analysis of residual adipic acid in the brine phase using an evaporative light scattering detector gave 1061 ppm adipic acid, corresponding to adipic acid incorporation of 94.4%.

Two addition formulations E7 and E8 were made similarly to E6 and varied in the amount of catalyst and initial pH. The relevant variables and results are shown in Table 2 below.

TABLE 2

|  | Unit | E6 | E7 | E8 |
| --- | --- | --- | --- | --- |
| Amount triethylamine | mol % | 1 | 5 | 5 |
| Amount initial water | gal | 35 | 35 | 35 |
| initial pH |  | 6 | 6 | 5 |
| Total NaOH solution added | lbs | 188.6 | 199.2 | 179.9 |
| Brine | lbs | 728 | 739 | 719 |
| adipic acid in brine | ppm | 1061 | 525 | 49 |
| Adipic acid incorporation | % | 94.4 | 97.2 | 99.7 |

Again, the results showed that as the amount of catalyst (triethylamine) increased in the initial formulation, the amount of adipic acid in the brine decreased. Comparing E7 to E8, lowering the initial pH decreased the amount of adipic acid in the brine as well.

Example 3

To better understand the relative importance of these variables, a half factorial experimental design was used to examine the effects of initial water, initial pH, the amount of phosgene added at this initial pH, and the phosgene addition rate. A series of formulations E10-E17 were made using the procedure of Example 1. For batches with low levels of initial water (E10, E12, E14, and E16), an additional charge of 8 L of deionized water was added when the pH was raised to 9.5. The level of adipic acid incorporation was measured by NMR on the final isolated resins. The relevant variables and results are shown in Table 3 below.

TABLE 3

|  | E10 | E11 | E12 | E13 | E14 | E15 | E16 | E17 |
| --- | --- | --- | --- | --- | --- | --- | --- | --- |
| initial water (L) 1st Phosgenation | 2 | 10 | 2 | 10 | 2 | 10 | 2 | 10 |
| initial pH | 6 | 6 | 6 | 6 | 4 | 4 | 4 | 4 |
| total phosgene added (g) | 1565 | 1175 | 1175 | 1565 | 1175 | 1565 | 1565 | 1175 |
| phosgenation rate (g/min) | 40 | 40 | 80 | 80 | 40 | 40 | 80 | 80 |
| % adipic acid incorporated | 68 | 51 | 78 | 35 | 86 | 82 | 84 | 61 |

The average level of incorporation in batches run with initial pH=4 was 78%, while the average level of incorporation in batches run with initial pH=6 was only 58%, showing that lower initial pH had a strong positive effect on adipic acid incorporation. The average level of incorporation in batches run with 2 L initial water was 79%, while the average level of incorporation in batches run with 10 L initial water was only 57%, showing that reducing initial water had a strong positive effect on adipic acid incorporation. Slower phosgenation rate had a smaller positive effect, with 40 g/min addition rate giving an average adipic acid incorporation of 72% while the 80 g/min addition rate gave an average incorporation of 64%. Adding more phosgene at the initial low pH had the smallest effect, with no significant difference between the average adipic acid incorporation when 1175 grams or 1565 grams phosgene was added at the initial low pH. However, the amount of phosgene added at low pH showed significant interactions with the other variables, like pH, and so affects the overall level of adipic acid incorporation.

Example 4

A 75-L reactor equipped with mechanical agitation and recirculation loop with turnover time <30 seconds, condenser, and caustic scrubber vent system was provided. In Example E18, the reactor was charged with bisphenol-A (4200 g, 18.42 moles), adipic acid (300 g, 2.05 moles), p-cumylphenol (145 g, 0.68 moles), triethylamine (30 ml, or 0.22 moles), sodium gluconate (10 g, 0.45 moles), deionized water (2 L), and dichloromethane (24 L). Phosgene (1565 g, 115.8 moles) was then added at a rate of 40 g/min to the reactor while 50 wt % NaOH in water was added at a rate sufficient to maintain a pH of 4.0. After the initial phosgenation was complete, deionized water (8 L) was added and the pH was raised to 9.5 thru addition of 50 wt % NaOH in water. Additional phosgene (1175 g, 11.9 moles) was then added at 80 g/minute while 50 wt % NaOH in water was added at a rate sufficient to maintain a pH of 9.5. The reactor was then purged with nitrogen for 10 minutes to remove any residual phosgene. Polymer Mw was determined by GPC to be 25,180 relative to PC standards. Adipic acid incorporation was determined by NMR on the final polymer.

Two other formulations E19 and E20 were made varying the initial pH and the amount of initial water. Batches E18 and E19 had 8 L of deionized water added after the initial phosgenation while batch E20 had 9 L of water added after the initial phosgenation. These formulations showed the benefits of reducing the amount of initial water (i.e., increasing the ratio of organic solvent to water). Results are shown in Table 4 below.

TABLE 4

|  | E18 | E19 | E20 |
| --- | --- | --- | --- |
| initial water (L) 1st Phosgenation | 2 | 2 | 1 |
| initial pH | 4 | 3 | 3.5 |
| phosgenation rate (g/min) | 40 | 40 | 40 |
| % adipic acid incorporated | 88 | 89 | 95 |

Reducing the amount of initial water increased the amount of adipic acid incorporated.

Example 5

Fourteen formulations E21-E34 were run to test the effect on ductility in adding the endcapping agent, PCP, either upfront (i.e. in the initial mixture) or as a cofeed during phosgenation. The results are shown in Tables 5 and 6 below.

TABLE 5

| Initial Formulation | Unit | E21 | E22 | E23 | E24 | E25 | E26 | E27 | E28 |
|---|---|---|---|---|---|---|---|---|---|
| $CH_2Cl_2$ | L | 20 | 20 | 24 | 20 | 24 | 24 | 24 | 24 |
| Water | L | 2 | 2 | 2 | 2 | 2 | 2 | 2 | 2 |
| BPA | g | 4200 | 4200 | 4200 | 4200 | 4200 | 4200 | 4200 | 4200 |
| Adipic Acid | g | 300 | 300 | 300 | 300 | 300 | 300 | 300 | 300 |
| Triethylamine | ml | 30 | 30 | 30 | 30 | 30 | 30 | 30 | 30 |
| PCP | g | 120 | 140 | 140 | 160 | 160 | 160 | 160 | 180 |
| Na Gluconate | g | 10 | 10 | 10 | 10 | 10 | 10 | 10 | 10 |
| 1st Phosgenation Step | | | | | | | | | |
| pH | | 4 | 4 | 4 | 4 | 4 | 4 | 4 | 4 |
| total phosgene added | g | 1565 | 1565 | 1565 | 1565 | 1565 | 1565 | 1565 | 1565 |
| phosgenation rate | g/min | 80 | 80 | 80 | 80 | 80 | 80 | 80 | 80 |
| Cofed PCP | g | 0 | 0 | 0 | 0 | 0 | 0 | 0 | 0 |
| 2nd Phosgenation step | | | | | | | | | |
| water | L | 8 | 8 | 8 | 8 | 8 | 8 | 8 | 8 |
| pH | | 9.5 | 9.5 | 9.5 | 9.5 | 9.5 | 9.5 | 9.5 | 9.5 |
| total phosgene added | g | 1175 | 1175 | 1175 | 1175 | 1175 | 1175 | 1175 | 1175 |
| phosgenation rate | g/min | 80 | 80 | 80 | 80 | 80 | 80 | 80 | 80 |
| PCP feed | | up front | up front | up front | up front | up front | up front | up front | up front |
| MVR | g/10 min | 12.8 | 18.7 | 23.6 | 27.0 | 29.1 | 34.3 | 34.6 | 65.3 |
| Notched Izod Impact energy @ 23° C. | MPa | 903.0 | 846.0 | 852 | 791.0 | 833 | 719.0 | 749.0 | 685 |
| Ductility @ 23° C. | % | 100 | 100 | 100 | 100 | 100 | 100 | 100 | 100 |
| Ductility @ 0° C. | % | 100 | 100 | 100 | 100 | 100 | 100 | 100 | 0 |
| Ductility @ −10° C. | % | 80 | 100 | 60 | 60 | 25 | 0 | 40 | 0 |
| Ductility @ −20° C. | % | 80 | 80 | 0 | 0 | 0 | | 0 | 0 |
| estimated D/B temp | C. | −23.8 | −23.8 | −11.7 | −11.7 | −6.7 | −5.0 | −9.8 | 11.5 |

TABLE 6

| Initial Formulation | Unit | E29 | E30 | E31 | E32 | E33 | E34 |
|---|---|---|---|---|---|---|---|
| $CH_2Cl_2$ | L | 24 | 24 | 24 | 24 | 24 | 24 |
| Water | L | 2 | 2 | 2 | 2 | 2 | 2 |
| BPA | g | 4200 | 4200 | 4200 | 4200 | 4200 | 4200 |
| Adipic Acid | g | 300 | 300 | 300 | 300 | 300 | 300 |
| Triethylamine | ml | 30 | 30 | 30 | 30 | 30 | 30 |
| PCP | g | 0 | 0 | 0 | 0 | 0 | 0 |
| Na Gluconate | g | 10 | 10 | 10 | 10 | 10 | 10 |
| 1st Phosgenation Step | | | | | | | |
| pH | | 4 | 4 | 4 | 4 | 4 | 4 |
| total phosgene added | g | 1565 | 1565 | 1565 | 1565 | 1565 | 1565 |
| phosgenation rate | g/min | 80 | 80 | 80 | 80 | 80 | 80 |
| Cofed PCP | g | 140 | 160 | 160 | 160 | 160 | 180 |
| 2nd Phosgenation step | | | | | | | |
| water | L | 8 | 8 | 8 | 8 | 8 | 8 |
| pH | | 9.5 | 9.5 | 9.5 | 9.5 | 9.5 | 9.5 |
| total phosgene added | g | 1175 | 1175 | 1175 | 1175 | 1175 | 1175 |
| phosgenation rate | g/min | 80 | 80 | 80 | 80 | 80 | 80 |
| PCP feed | | cofeed | cofeed | cofeed | cofeed | cofeed | cofeed |
| MVR | g/10 min | 19.3 | 27.6 | 29.9 | 30.0 | 32.3 | 40.6 |
| Notched Izod Impact energy @ 23° C. | MPa | 808 | 749.0 | 740.0 | 715.0 | 798 | 792 |
| Ductility @ 23° C. | % | 100 | 100 | 100 | 100 | 100 | 100 |
| Ductility @ 0° C. | % | 100 | 100 | 100 | 40 | 60 | 100 |
| Ductility @ −10° C. | % | 20 | 25 | 0 | 0 | 0 | 20 |
| Ductility @ −20° C. | % | 0 | 0 | 0 | 0 | 0 | 0 |
| estimated D/B temp | C. | −6.3 | −6.7 | −5.0 | 3.8 | −1.7 | −6.3 |

The results showed that adding PCP before phosgenation results in polymers with better ductility than similar polymers made by cofeeding the PCP during phosgenation. A lower ductile/brittle transition temperature is preferred. An improvement in ductile/brittle transition temperature of just 5° C. can be significant for end use applications.

In general, polymers with lower Mw have higher flow and poorer ductility than polymers with higher Mw, so comparisons of ductile/brittle transition temperatures must be made at equivalent flow. However, the data scatter involved in notched Izod testing for ductility means that multiple comparisons must be made to assure statistical significance. Comparing E22 and E29, which both had an MVR of about 19, showed that cofed E29 had a ductile/brittle transition temperature of −6.3° C. while upfront E22 had a ductile/brittle transition temp of −23.8° C. Comparing E24 and E30, which both had an MVR of about 27, showed that cofed E30 had a ductile/brittle transition temperature of −6.7° C. while upfront E24 had a ductile/brittle transition temperature of −11.7° C. Comparing E25 with E31 and E32, which had an MVR of about 30, showed that cofed E31 and E32 had ductile/brittle transition temperatures of −5.0° C. and 3.8° C., respectively, while upfront E25 had a ductile/brittle transition temperature of −6.7° C. Comparing E26 and E27 with E33, which had an MVR of about 33, showed that cofed E33 had a ductile/brittle transition temperature of −1.7° C. while upfront E26 and E27 had ductile/brittle transition temperatures of −5.0° C. and −9.8° C., respectively. It was concluded that adding the endcapping agent into the initial mixture instead of cofeeding endcapping agent improved the ductility performance of the polyestercarbonates.

The polyestercarbonates and processes of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

I claim:

1. A process for producing a polyestercarbonate, comprising:
preparing an initial mixture comprising water, a substantially water-immiscible organic solvent, a dihydroxy compound, a catalyst, and adipic acid, wherein the volume ratio of organic solvent to water is 10:1 or more;
reacting the initial mixture by adding phosgene at a first phosgenation rate until the molar ratio of phosgene added to the sum of the dihydroxy compound and the adipic acid is at least 70 percent, while maintaining the pH between about 4 and about 6 to form a reaction mixture;
raising the pH to about 9.5; and
maintaining the pH at about 9.5 for a period of time of from about 5 minutes to about 60 minutes.

2. The process of claim 1, wherein the organic solvent is methylene chloride.

3. The process of claim 1, wherein the catalyst is triethylamine.

4. The process of claim 1, wherein the volume ratio of organic solvent to water of the initial mixture is about 20:1 or more.

5. The process of claim 1, wherein the molar ratio of catalyst to the sum of the dihydroxy compound and the adipic acid in the initial mixture is at least 4 percent.

6. The process of claim 1, wherein the molar ratio of catalyst to the sum of the dihydroxy compound and the adipic acid in the initial mixture is about 5 percent or more.

7. The process of claim 1, wherein the molar ratio of catalyst to the sum of the dihydroxy compound and the adipic acid in the initial mixture is about 8 percent or more.

8. The process of claim 1, further comprising adding phosgene to the reaction mixture at a second phosgenation rate while the pH of the reaction mixture is maintained at about 9.5.

9. The process of claim 1, wherein the dihydroxy compound has the structure of Formula (I):

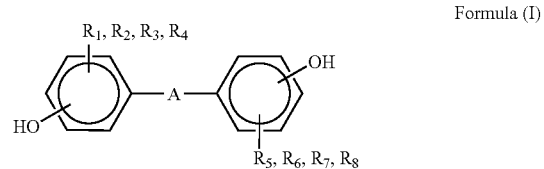

wherein $R_1$ through $R_8$ are each independently selected from hydrogen, halogen, nitro, cyano, $C_1$-$C_{20}$ aliphatic, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ aliphatic, $C_1$-$C_{12}$ alkyl, $C_6$-$C_{20}$ aromatic, and $C_6$-$C_{20}$ cycloaliphatic.

10. The process of claim 1, wherein the first phosgenation rate is such that the molar ratio of phosgene added to the sum of the dihydroxy compound and the adipic acid does not reach 70 percent until after 20 minutes.

11. The process of claim 1, wherein the initial mixture further comprises an endcapping agent.

12. The process of claim 1, wherein an endcapping agent is added to the initial mixture along with the carbonate precursor.

13. The polyestercarbonate formed by the process of claim 1.

14. An article formed from the polyestercarbonate of claim 13.

15. A process for preparing a polyestercarbonate, comprising:
preparing an initial mixture comprising water, a substantially water-immiscible organic solvent, a dihydroxy compound, a catalyst, and adipic acid, wherein the molar ratio of catalyst to the sum of the dihydroxy compound and the adipic acid is at least 4 percent;
reacting the initial mixture by adding phosgene at a first phosgenation rate until the molar ratio of phosgene added to the sum of the dihydroxy compound and the adipic acid is at least 70 percent, while maintaining the pH between about 4.5 and about 6.0 to form a reaction mixture; and
adding phosgene while maintaining the pH at about 9.5 for a period of time of from about 20 minutes to about 40 minutes.

16. The process of claim 15, wherein the volume ratio of organic solvent to water of the initial mixture is 10:1 or more.

17. The polyestercarbonate formed by the process of claim 15.

18. An article formed from the polyestercarbonate of claim 17.

19. A process for producing a polyestercarbonate, comprising:
preparing an initial mixture comprising water, a substantially water-immiscible organic solvent, a dihydroxy compound, a catalyst, and adipic acid, wherein (i) the volume ratio of organic solvent to water is 10:1 or more and (ii) the molar ratio of catalyst to the sum of the dihydroxy compound and the adipic acid is at least 4 percent;

reacting the initial mixture by adding phosgene at a first phosgenation rate until the molar ratio of phosgene added to the sum of the dihydroxy compound and the adipic acid is at least 70 percent, while maintaining the pH between about 4 and about 6 to form a reaction mixture;

raising the pH to about 9.5; and adding phosgene while maintaining the pH at about 9.5 until the reaction is substantially complete.

20. The process of claim 19, wherein the volume ratio of organic solvent to water of the initial mixture is about 20:1 or more.

21. The process of claim 19, wherein the molar ratio of catalyst to the sum of the dihydroxy compound and the adipic acid in the initial mixture is about 5 percent or more.

22. The process of claim 19, wherein the molar ratio of catalyst to the sum of the dihydroxy compound and the adipic acid in the initial mixture is about 8 percent or more.

23. The polyestercarbonate formed by the process of claim 19.

24. An article formed from the polyestercarbonate of claim 23.

* * * * *